Jan. 22, 1963     K. D. SCHREYER     3,074,355
FREE LINK CONVEYOR POWER CHAIN
Filed Sept. 23, 1958
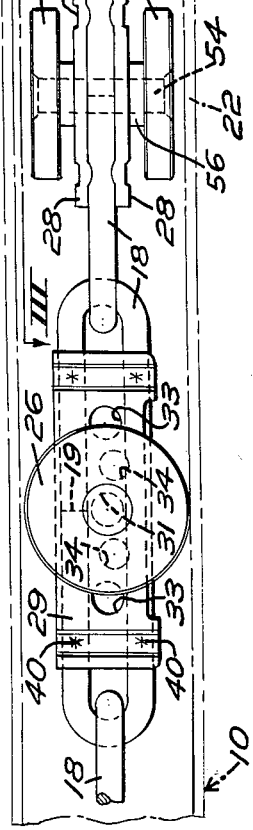
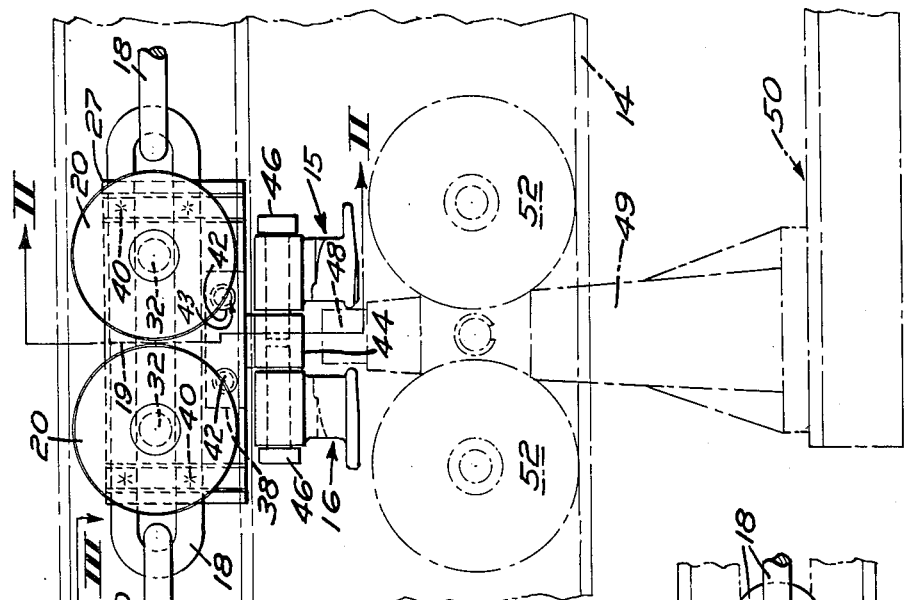
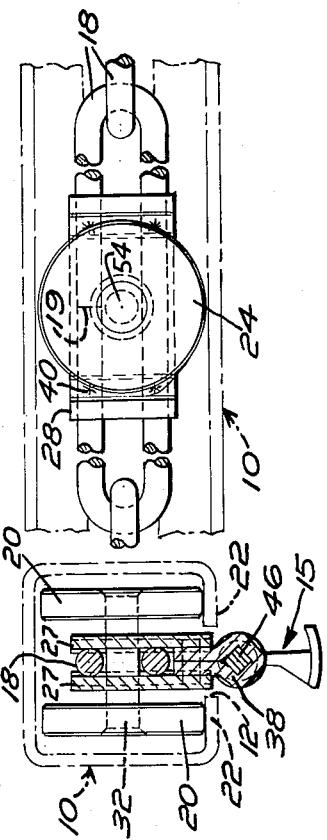
INVENTOR.
Kenneth D. Schreyer,
BY
Bean, Brooks, Buckley & Bean,
ATTORNEYS.

United States Patent Office 3,074,355
Patented Jan. 22, 1963

3,074,355
FREE LINK CONVEYOR POWER CHAIN
Kenneth D. Schreyer, Snyder, N.Y., assignor to Columbus McKinnon Corporation, Tonawanda, N.Y.
Filed Sept. 23, 1958, Ser. No. 762,868
4 Claims. (Cl. 104—172)

This invention relates to conveying mechanisms, and more particularly to that type of conveying mechanism in which a power chain is provided with extending means for selective engagement with and conveying of hangers or cars or trucks or other objects along trolley rails, tracks, floorways, or the like. The power chains of such conveyors are made up of wheeled links having their wheel devices alternately disposed in vertical and horizontal attitudes to rollingly support and guide the chain in its travel through curving track channels.

One object of the present invention is to provide a conveyor power chain as aforesaid which is made up of parts economical to manufacture, and so designed that these parts are readily and easily assembled to provide a durable and rugged power chain and conveying unit.

Another object is to provide improved mounting arrangements in a power chain for the chain guide rollers, of such nature that special and complicated structural components are not necessary.

Another object of the invention is to provide a conveyor power chain as aforesaid in which the chain is of optimum flexibility both in horizontal and vertical directions.

Another object of the invention is to provide a conveyor power chain as aforesaid which is capable of passing around curves of extremely short radius, either horizontally or vertically, without the use of sprockets, rollers, or guide elements other than the supporting track.

Another object of the invention is to provide in a conveyor power chain as aforesaid chain links and mounting plates constituting standardized production items which will accept a variety of guide roller and load pick-up arrangements without requiring modifications of the parts.

Another object of the invention is to provide improvements in power chain constructions as aforesaid which are particularly suited to use in conveyor devices wherein the chain elements consisting of the wheeled links coupled together with the wheels thereof disposed alternately vertically and horizontally travel entirely within an enclosed box-like sectioned supporting track.

Other objects and advantages of the invention will become apparent from the following specification, wherein the drawing illustrates various forms of the invention, and in which:

FIG. 1 is a fragmentary side elevational view of a power chain and load pick-up arrangement, embodying three forms of guide roller and load lug mounting plate components of the device of the invention;

FIG. 2 is a sectional view taken on line II—II of FIG. 1;

FIG. 3 is a fragmentary plan view taken along line III—III of FIG. 1; and

FIG. 4 shows a modified usage of one of the chain components of FIG. 1.

Conveying mechanisms of the type to which this invention relates are commonly employed in connection with warehousing or manufacturing assembly or production lines, or the like; and comprise flexible power chains running in either overhead or underground trackways having load pick-up means extending from the trackway to engage load carrying racks, dollies, trolleys, or the like. For example, as shown herein the power chain supporting track is indicated at 10 to be of box-shaped cross section with the bottom wall thereof slotted as indicated at 12, so that the trackway is adapted for overhead conveyor use. However, the slot may be in the top or in either side wall of the track member, depending upon the relative position of the power chain and the work to be conveyed. Similarly, the load carrying track if used, may for example be of box-sectioned form as illustrated at 14, suitably slotted in its top wall to accommodate the driving dogs 15 depending from the power chain. In this case, in order to prevent the article being conveyed from advancing at a greater rate than the rate of speed of the conveyor power chain, such as when the tracks are inclined downwardly in the direction of travel, a so-called back-up dog 16 may be employed in connection with each of the driving dogs 15. These back-up dogs are placed a short distance in advance of the driving dogs and are so constructed that when a back-up dog engages an object when moving towards the object in the direction of desired travel it will trip to allow the object or contact portion thereof to pass by it to a position to engage the succeeding driving dog, and thereafter will be operative to prevent undesired forward movement of the conveyed object relative to the conveyor power chain.

The finished track sections may of course be supplied in any appropriate standard lengths, both in straight sections and in sections curved horizontally to the right and to the left, and in sections curved vertically both upwardly or downwardly. The sections may be secured to the building structure by any suitable brackets, or hangers, or in any other suitable manner; and the abutting ends of the sections may be secured together by any suitable joint brackets.

As shown in FIGS. 1, 2, 3, the entire conveyor power chain is made up of identical links 18 formed by bending wire stock into closed C-shaped form and butting together the ends as indicated at 19. The load pick-up unit as shown in FIGS. 1, 2, is of the four-wheel type, comprising two pairs of wheels 20 which ride upon the bottom runway flanges 22 of the supporting track 10. Intermediately of the load pick-up units the chain links are arranged to mount horizontally disposed guide rollers; and in some cases vertical roller guide devices will be disposed between the horizontal roller guide devices. Thus, as shown in FIG. 1, the links of the chain next to the load pick-up unit carry horizontally disposed guide rollers 24 which are of diameters only slightly smaller than the inside width of the track 10, so that these rollers have free rolling contact with the side walls of the trackway for guiding the chain around horizontal curves. The next disposed links are provided with vertically disposed rollers as indicated at 26, to run on the bottom flanges of the track; and thus the power chain is roller-guided in both directions as it trains through the track system.

As shown in conjunction with the load pick-up unit portion of FIG. 1, the rollers 20—20 are carried by a pair of mounting plates 27—27 spot-welded at 40 to the sides of the link 18. The two plates are identical and are each formed with two apertures 32, 32 for the two axles of the four wheels 20 and apertures 42—42 for reception of rivets 43 holding support bracket 38 formed with an eye portion 44 receiving pins 46—46 carrying the dogs 15, 16, in position to intercept the knob portion 48 of a bracket 49 from which extends the load carrying bar 50. The bracket 49 is shown rollably supported upon the load track 14, as by rollers 52—52. It will be noted that each plate 27 is of a length substantially less than the length of the associated link 18, such link being of a length greater than twice the diameter of one of the wheels 20, as can be readily seen from the right hand side of FIG. 1.

The guide unit carrying the rollers 24 comprises a standard link 18 having a pair of roller mounting plates 28, 28 spot-welded as indicated at 40 to opposite sides of the link. The plates 28 are centrally apertured to carry an axle 54 supporting the rollers 24, 24; with spacers 56 therebetween to free the wheels for rotation.

The chain guide unit mounting the rollers 26—26 comprises a standard link 18 against opposite sides of which are spot-welded roller mounting plates 29, 29, as indicated at 40. The plates 29, 29 are identical and are formed with central apertures 31; opposite end apertures 33, 33; and intermediate apertures 34, 34. Thus, the central aperture 31 will accommodate the axle of a single pair of rollers 26, as illustrated in FIG. 1; which alternatively, the apertures 33, 33 may be employed to carry a pair of axles when it is desired to adapt the unit to a four-roller type as illustrated for example at the right hand end portion of FIG. 1. The unit will then be adapted to receive a modified form of load pick-up lug support bracket, as is illustrated in FIG. 4.

FIG. 4 illustrates use of the same form of support plates as last referred to hereinabove in conjunction with a load pick-up unit comprising a chain link 58 which is of C-shaped form having the support plates 29, 29 welded thereto as indicated at 40. The roller axles are disposed within the plate apertures 33, 33, and the lug support bracket is illustrated to comprise an eye portion 55 receiving the lug support pins 46, 46, and an enlarged head portion apertured in alignment with the apertures 34, 34, of the support plates and receiving retaining pins 35 which project through the support plates as well as the lug support bracket. Thus, in this form of the invention the eye portion or bracket 55 is disposed substantially between the plates and provides a unit requiring reduced overall head room; while the head portion of the bracket occupies the central space interiorly of the link and the support plates, and thus materially integrates and strengthens the structure.

Thus, it will be appreciated that the support plates 29 may be fabricated as standardized components which may be employed with equal facility in conjunction with any of the versions of the guide and load pick-up units illustrated herein; and that the various forms of the invention as shown herein are of simple and rugged construction and may be easily and inexpensively produced.

Although only a few forms of the invention have been illustrated and described in detail hereinabove, it will be understood that various changes may be made therein without departing from the spirit of the invention or the scope of the following claims.

I claim:
1. A conveyor power chain load pick-up component, comprising a chain link of generally rectangular, open configuration, a pair of support plates integrally fixed to opposite sides of said link, said plates each having a plurality of apertures therethrough in paired alignment and disposed to align within the open region of said link, a pick-up lug support bracket having a portion thereof disposed between said plates and apertured in alignment with apertures of said plates, connection means disposed within some of said aligned plate and bracket apertures and extending through said plates and said brackets and locking them together, axle means mounted within other aligned apertures of said plates and mounting thereon guide rollers at opposite ends thereof, and a load pick-up lug pivotably mounted upon and thereby suspending from an extending end portion of said bracket.

2. A support plate for use in a variety of forms of conveyor power chain components, said plate being of rectangular shape and having a centrally disposed aperture, a pair of end apertures, and a pair of intermediately disposed apertures, said central and end apertures being alternatively adapted to receive wheel carrying axle means, and said intermediate apertures being adapted to receive load pick-up lug support bracket connection means.

3. A conveyor power chain load pick-up component, comprising a chain link of generally rectangular, open configuration, identical support plates integrally fixed to opposite sides of said link, said plates having apertures therethrough in mutual alignment and disposed to align within the open region of said link, a pick-up device having a portion thereof disposed between said plates and apertures in alignment with apertures of said plates, connection means disposed within said aligned plate and device apertures and locking them together, and axle means mounted within other aligned apertures of said plates and mounting thereon guide rollers at opposite ends thereof.

4. A conveyor power chain and guide assembly comprising a plurality of identical link members joined in chain fashion to present an elongate, flexibility entity, each of said links being of generally rectangular open configuration and of a predetermined length and certain of said links having associated therewith a pair of identical plate components, some of said certain links having associated therewith plural pairs of vertical guide wheel members and carrying load pick-up means, and others of said certain links carrying a single pair of vertical guide wheels, all of said plates being identically formed and any one being cooperable with any of the others to form a cooperable pair for disposition in fixed relationship on opposite sides of an individual link to form the mounting means for any one or a plurality of the vertical guide wheels with or without the load pick-up means, each plate being of a length substantially less than said predetermined length of each link and the predetermined length of each link being greater than twice the diameter of said guide wheel means, each plate having at least three apertures therein disposed in longitudinally spaced relationship to align within the open region of an associated link for the reception of axle means of one pair of guide wheels in the intermediate aperture or the reception of plural axle means for plural pairs of guide wheels in the end ones of said apertures.

References Cited in the file of this patent
UNITED STATES PATENTS

| | | |
|---|---|---|
| 1,047,273 | Morris | Dec. 17, 1912 |
| 2,689,036 | Mullen et al. | Sept. 14, 1954 |
| 2,839,009 | Francis | June 17, 1958 |
| 2,947,264 | Parker | Aug. 2, 1960 |

FOREIGN PATENTS

| | | |
|---|---|---|
| 738,491 | Germany | Aug. 18, 1943 |

UNITED STATES PATENT OFFICE

CERTIFICATE OF CORRECTION

Patent No. 3,074,355                          January 22, 1963

Kenneth D. Schreyer

It is hereby certified that error appears in the above numbered patent requiring correction and that the said Letters Patent should read as corrected below.

Column 3, line 10, for "which" read -- while --; column 4, line 28, for "flexibility" read -- flexible --.

Signed and sealed this 24th day of September 1963.

(SEAL)
Attest:

ERNEST W. SWIDER
Attesting Officer

DAVID L. LADD
Commissioner of Patents